United States Patent
Doggett et al.

(10) Patent No.: US 11,494,584 B2
(45) Date of Patent: Nov. 8, 2022

(54) AUTOMATED PREDICTION OF PIXEL ERROR NOTICEABILITY

(71) Applicant: Disney Enterprises, Inc., Burbank, CA (US)

(72) Inventors: Erika Varis Doggett, Los Angeles, CA (US); David T. Nguyen, Newark, CA (US); Erick Keyu Qi, Dongguan (CN); Yingying Zhong, Shenzhen (CN); Weichu Cui, Shenzhen (CN); Anna M. Wolak, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 178 days.

(21) Appl. No.: 17/146,975

(22) Filed: Jan. 12, 2021

(65) Prior Publication Data

US 2022/0222487 A1 Jul. 14, 2022

(51) Int. Cl.
*G06K 9/62* (2022.01)
*G06T 7/00* (2017.01)
*G06V 40/20* (2022.01)

(52) U.S. Cl.
CPC ......... *G06K 9/6254* (2013.01); *G06K 9/6232* (2013.01); *G06K 9/6257* (2013.01); *G06T 7/0004* (2013.01); *G06V 40/20* (2022.01); *G06T 2207/10016* (2013.01); *G06T 2207/20081* (2013.01); *G06T 2207/20084* (2013.01)

(58) Field of Classification Search
CPC .. G06K 9/6254; G06K 9/6232; G06K 9/6257; G06T 7/0004; G06T 2207/10016; G06T 2207/20081; G06T 2207/20084; G06T 2207/30168; G06T 7/0002; G06V 40/20; H04N 17/00

See application file for complete search history.

(56) References Cited

U.S. PATENT DOCUMENTS

| | | | |
|---|---|---|---|
| 7,715,646 | B2 | 5/2010 | Johnson |
| 8,150,234 | B2 | 4/2012 | Bourret |
| 8,848,061 | B2 | 9/2014 | Kolarov et al. |
| 11,403,491 | B2* | 8/2022 | Planche ................ G06N 3/08 |
| 2017/0243328 | A1* | 8/2017 | Lee ........................ H04N 5/44 |

(Continued)

OTHER PUBLICATIONS

"A Perceptual Distinguishability Predictor for JND-noise-contaminated Images" by Hadizadeh et al. (IEEE 2018).

(Continued)

*Primary Examiner* — Bobbak Safaipour
(74) *Attorney, Agent, or Firm* — Farjami & Farjami LLP

(57) ABSTRACT

A system includes a hardware processor and a memory storing a software code including a predictive model. The hardware processor executes the software code to receive an input including an image having a pixel anomaly, and image data identifying the location of the pixel anomaly in the image. The software code uses the predictive model to extract a global feature map of a global image region of the image, the pixel anomaly being located within the global image region; to extract a local feature map of a local image region of the image, the pixel anomaly being located within the local image region and the local image region being smaller than the global image region; and to predict, based on the global feature map and the local feature map, a distraction level of the pixel anomaly within the image.

20 Claims, 6 Drawing Sheets

(56) References Cited

U.S. PATENT DOCUMENTS

| | | |
|---|---|---|
| 2019/0362156 A1 | 11/2019 | Muppala et al. |
| 2020/0219245 A1 | 7/2020 | Doggett et al. |
| 2021/0304387 A1* | 9/2021 | Schroers .............. G06N 3/0454 |
| 2022/0092756 A1* | 3/2022 | Huang ................... G06V 10/25 |
| 2022/0222487 A1* | 7/2022 | Doggett ................ G06V 40/20 |
| 2022/0269824 A1* | 8/2022 | Hao ..................... G06F 21/6263 |

OTHER PUBLICATIONS

"Review of Visual Saliency Detection with Comprehensive Information" by Cong et al. (IEEE 2018).

"Visual JND: A Perceptual Measurement in Video Coding" by Yuan et al. (IEEE 2019).

* cited by examiner

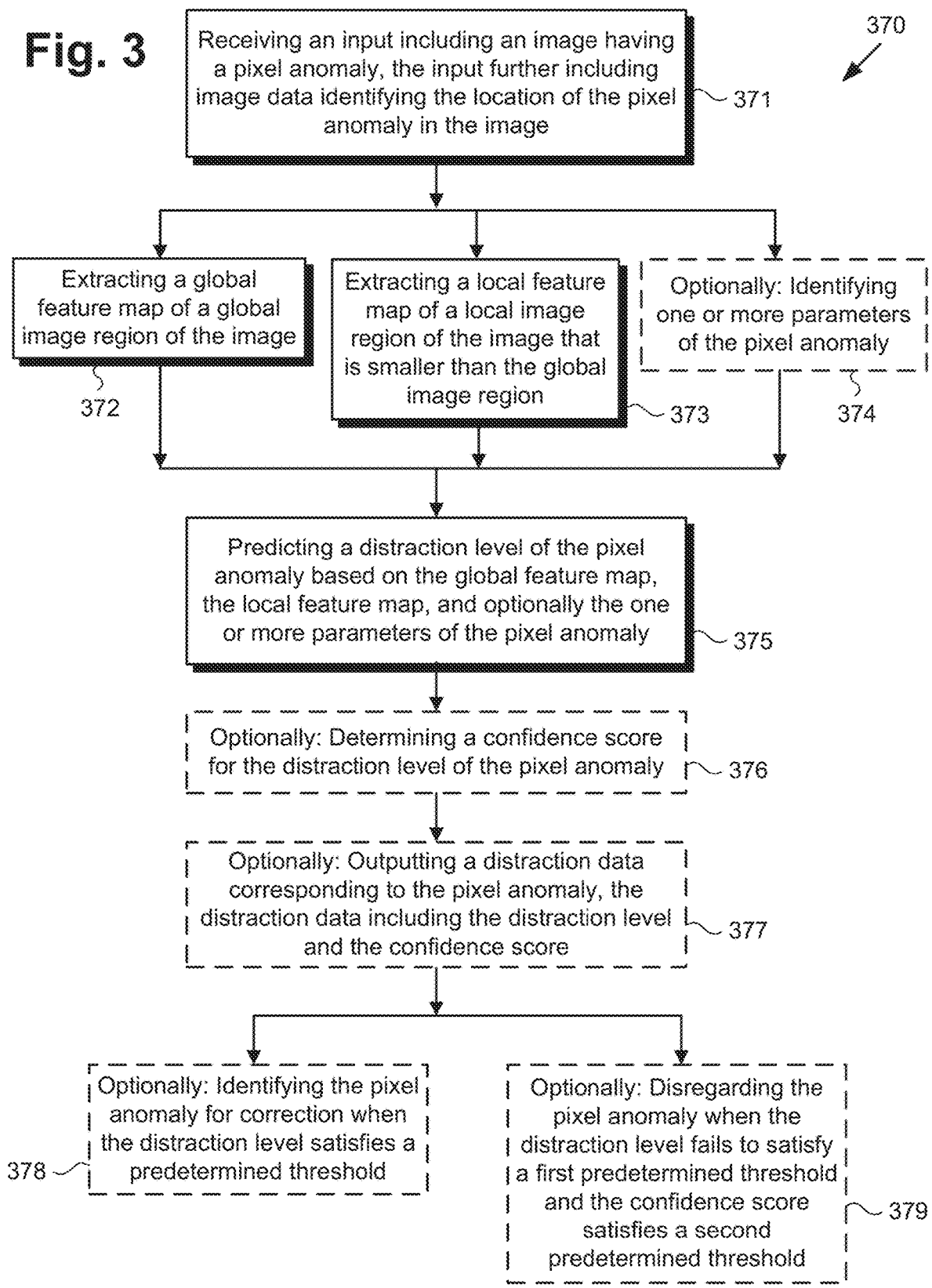

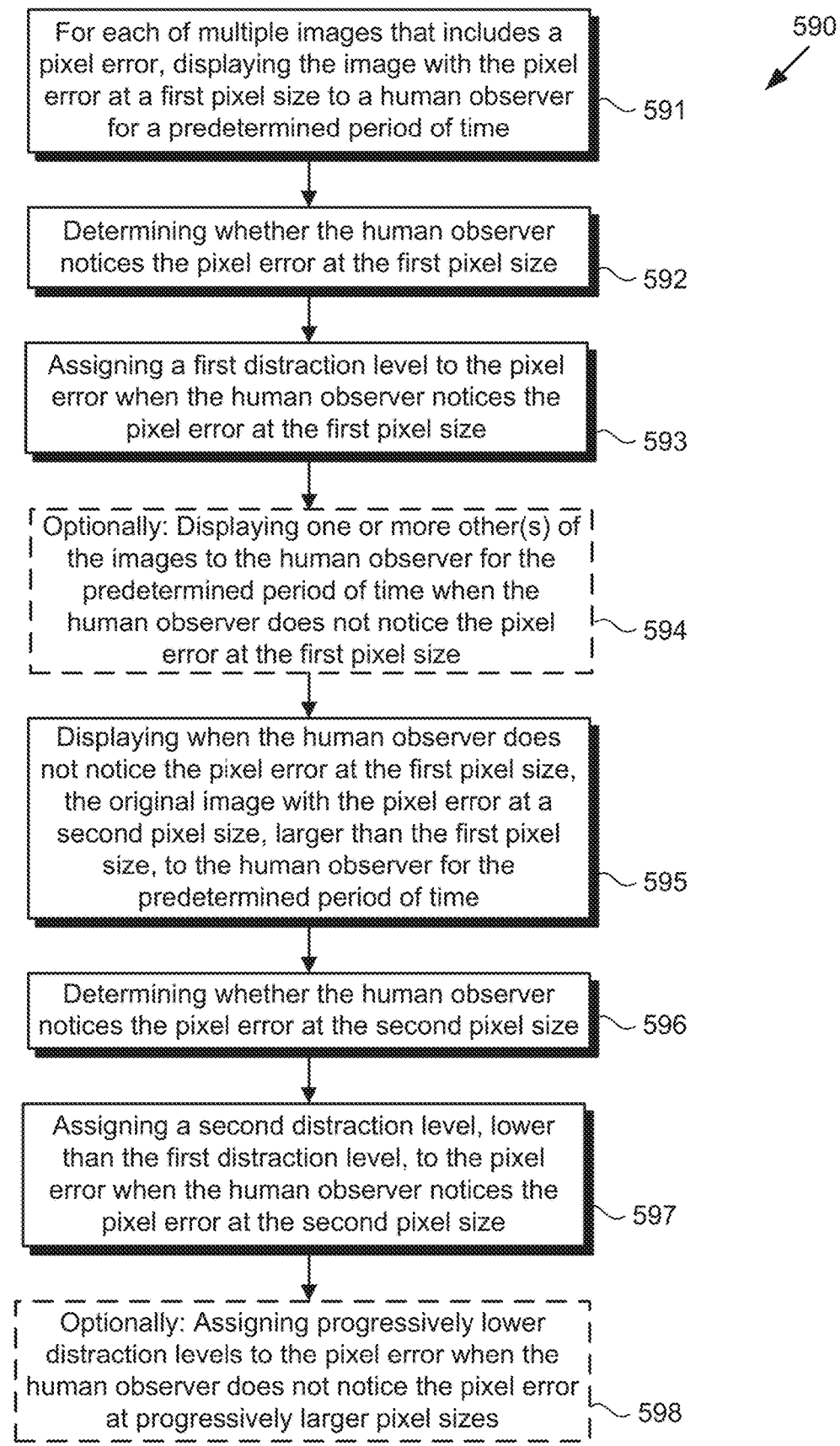

AUTOMATED PREDICTION OF PIXEL ERROR NOTICEABILITY

BACKGROUND

Pixel errors in images occur with regularity but can be difficult and costly to correct. For example, pixel anomalies in video frames can be introduced by many different processes within a video production pipeline. A final quality procedure for correcting such errors is typically done before the video undergoes final release, and in the conventional art that process is usually performed by human inspectors. Due to its reliance on human participation, pixel error correction is expensive and time consuming.

However, not all pixel errors require correction. For example, depending on its position within an image, its visual impact relative to other features in its local environment within the image, as well as the visual qualities of the image as a whole, some pixel anomalies may be highly distracting, while others may be less so, and still others may reasonably be disregarded without significantly affecting an intended esthetic of the image. That is to say, not all pixel errors are of equal importance. Accordingly, there is a need in the art for an automated approach to predicting the noticeability of pixel errors in an image.

SUMMARY

There are provided systems and methods for performing automated prediction of pixel error noticeability, substantially as shown in and described in connection with at least one of the figures, and as set forth more completely in the claims.

BRIEF DESCRIPTION OF THE DRAWINGS

FIG. 3 shows a flowchart presenting an exemplary method for performing automated prediction of pixel error noticeability, according to one implementation;

FIG. 5 shows a flowchart presenting an exemplary method for generating a just-noticeable difference (JND) based training dataset for use in training a machine learning model to perform automated prediction of pixel error noticeability, according to one implementation.

DETAILED DESCRIPTION

Figure 1:
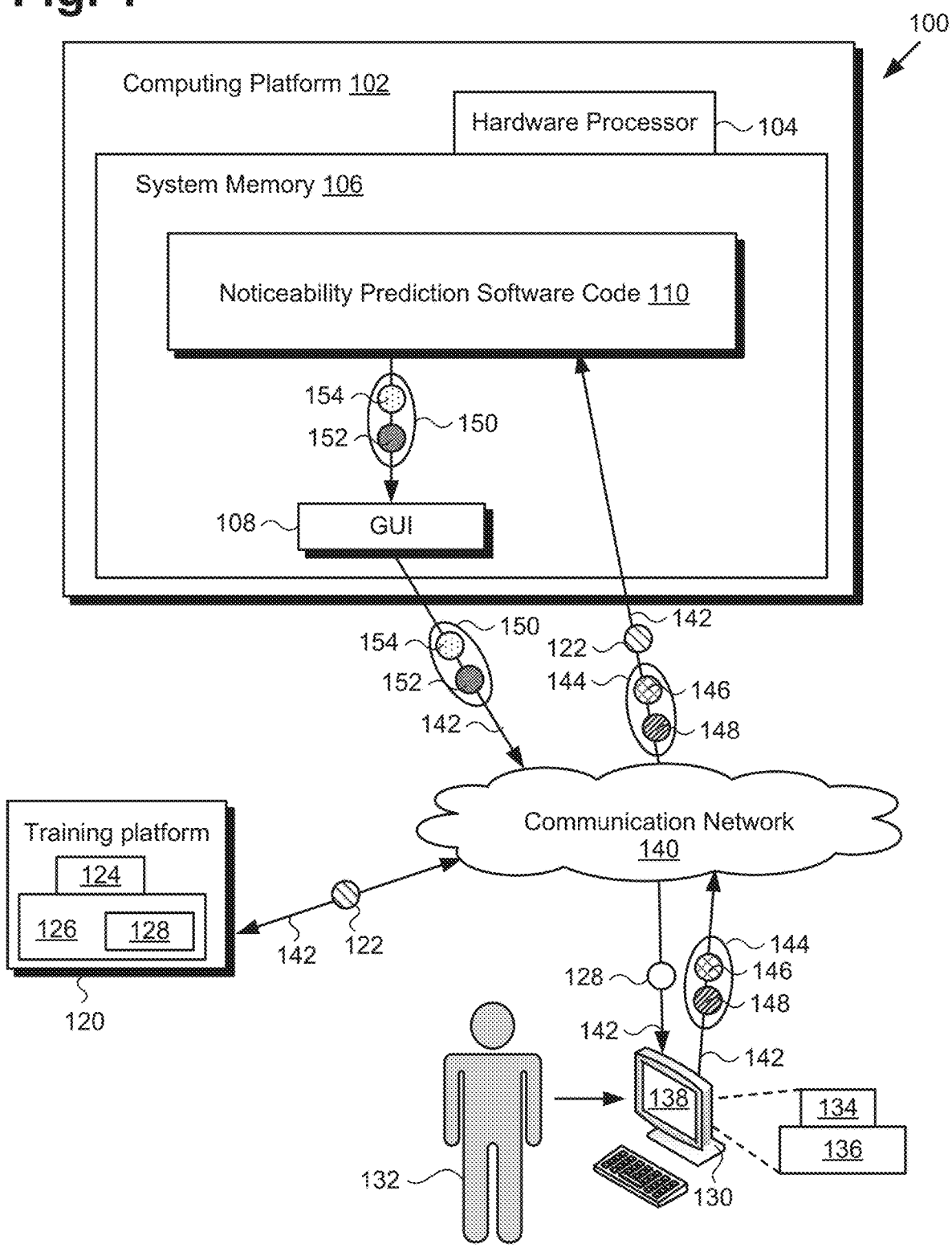
FIG. 1 shows a diagram of exemplary systems for performing automated prediction of pixel error noticeability, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated prediction of pixel error noticeability that overcome the drawbacks and deficiencies in the conventional art. It is noted that, as used in the present application, the term "noticeability" refers to how much a feature of a visual image distracts from the esthetic or artistic intent of the creator of the image. Thus, the more a pixel error (hereinafter also "pixel anomaly") present in an image distracts from the creative intent motivating the image, the greater its noticeability. Accordingly, the less a pixel anomaly present in an image distracts from the creative intent motivating the image, the less its noticeability. It is further noted, that as used in the present application, the feature "pixel error" or "pixel anomaly" may refer to a single anomalous pixel, or to a cluster of two or more anomalous pixels.

It is also noted that the methods disclosed by the present application may be performed as substantially automated processes by substantially automated systems. As used in the present application, the terms "automation," "automated." and "automating" refer to systems and processes that do not require the participation of a human user. Although, in some implementations, a human inspector may review the performance of the automated systems described herein, that human involvement is optional. Thus, the methods described in the present application may be performed under the control of hardware processing components of the disclosed automated systems.

Moreover, as defined in the present application, an artificial neural network, also known simply as a neural network (NN), is a type of machine learning framework in which patterns or learned representations of observed data are processed using highly connected computational layers that map the relationship between inputs and outputs. A "deep neural network" (deep NN), in the context of deep learning, may refer to a neural network that utilizes multiple hidden layers, and different forms of connections among those layers, between input and output layers, which may allow for learning based on features not explicitly defined in raw data. NNs may be designed to progressively improve their performance of a specific task as new data is received and to adapt to new patterns of a dynamic system. As such, various forms of NNs may be used to make predictions about new data based on past examples or "training data." In various implementations. NNs may be utilized to perform image processing or natural-language processing.

FIG. 1 shows a diagram of exemplary systems for performing automated distraction level classification of pixel errors, according to one implementation. As shown in FIG. 1, system 100 includes computing platform 102 having hardware processor 104 and system memory 106 implemented as a non-transitory storage device storing noticeability prediction software code 110. As further shown in FIG. 1, in some implementations, noticeability prediction software code 110 provides graphical user interface (GUI) 108. It is noted that, as described below by reference to FIG. 2, noticeability prediction software code 110 includes a predictive model implemented using one or more trained NNs, which may be configured to predict the noticeability of one or more pixel anomalies included in image 146 of input 144 to system 100. It is noted that, in addition to image 146, input 144 may also include image data 148 identifying the location or locations. e.g., coordinates, of the one or more pixel anomalies in image 146. It is further noted that although the present disclosure refers to input 144 as including a single image 146, more generally, input 144 may include multiple images having pixel anomalies, which may be processed in parallel by system 100.

As shown in FIG. 1, system 100 is implemented within a use environment including training platform 120 having hardware processor 124 and memory 126 implemented as a non-transitory storage device storing training software code 128. Training software code 128, when executed by hardware processor 124 of training platform 120, is configured to generate training dataset 122 for use in training the predictive model included in noticeability prediction software code 110. In addition, FIG. 1 shows communication network 140, and user system 130 including display 138 and optional user system hardware processor 134 and user system memory 136. User system 130 is configured to be utilized by user 132 to interact with system 100. Also shown in FIG. 1 are network communication links 142 communicatively coupling training platform 120 and user system 130 with system 100 via communication network 140, as well as distraction data 150 including predicted distraction level 152 and its associated confidence score 154 for each pixel anomaly in image 146 that has a predicted distraction level satisfying a predetermined threshold, i.e., each pixel anomaly determined to be sufficiently distracting to require correction.

Noticeability prediction software code 110, when executed by hardware processor 104 of computing platform 102, is configured to receive input 144 including image 146 and image data 148, and to output distraction data 150 including predicted distraction level 152 and confidence score 154 to user 132 when appropriate in view of predicted distraction level 152 and confidence score 154. It is noted that although the present application refers to noticeability prediction software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102, or to optional user system hardware processor 134 of user system 130. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Hardware processor 104 may include multiple hardware processing units, such as one or more central processing units and one or more graphics processing units. By way of definition, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 102, as well as a Control Unit (CU) for retrieving programs, such as noticeability prediction software code 110, from system memory 106. A GPU may be implemented to reduce the processing overhead of the CPU by performing computationally intensive graphics processing tasks.

Moreover, although FIG. 1 depicts training platform 120 as a computer platform remote from system 100, that representation is also merely exemplary. More generally, system 100 may include one or more computing platforms, such as computer servers for example, which may form an interactively linked but distributed system, such as a cloud-based system, for instance. As a result, hardware processor 104 and system memory 106 may correspond to distributed processor and memory resources within system 100, while training platform 120 may be a component of system 100. In one implementation, computing platform 102 of system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

User 132 may utilize user system 130 to interact with system 100 to submit input 144 including image 146 and image data 148 for analysis by noticeability prediction software code 110, executed by hardware processor 104, and, in some implementations, to receive distraction data 150 generated by noticeability prediction software code 110. It is noted that, in various implementations, distraction data 150, when generated using noticeability prediction software code 110, may be displayed via GUI 108, may be stored in memory 106, may be copied to non-volatile storage, or may be stored in memory 106 and also be copied to non-volatile storage. Alternatively, or in addition, as shown in FIG. 1, in some implementations, distraction data 150 may be sent to user system 130 including display 138, for example by being transferred via network communication links 142 of communication network 140.

In some implementations, noticeability prediction software code 110 may be utilized directly by user system 130. For example, noticeability prediction software code 110 may be transferred to user system memory 136, via download over communication network 140, for example, or via transfer using a computer-readable non-transitory medium, such as an optical disc or FLASH drive. In those implementations, noticeability prediction software code 110 may be persistently stored on user system memory 136, and may be executed locally on user system 130 by user system hardware processor 134.

Although user system 130 is shown as a desktop computer in FIG. 1, that representation is provided merely as an example. More generally, user system 130 may be any suitable mobile or stationary computing device or system that implements data processing capabilities sufficient to provide a user interface, support connections to communication network 140, and implement the functionality ascribed to user system 130 herein. For example, in some implementations, user system 130 may take the form of a laptop computer, tablet computer, or smartphone, for example. However, in other implementations user system 130 may be a "dumb terminal" peripheral component of system 100 that enables user 132 to provide inputs via a keyboard or other input device, as well as to interact with GUI 108 to view distraction data 150 on display 138. In those implementations, user system 130 and display 138 may be controlled by hardware processor 104 of system 100. Alternatively, in some implementations, user 132 may utilize hardware processor 134 of user system 130 to execute noticeability prediction software code 110 stored in user system memory 136, thereby generating distraction data 150 locally on user system 130.

With respect to display 138 of user system 130, display 138 may be physically integrated with user system 130 or may be communicatively coupled to but physically separate from user system 130. For example, where user system 130 is implemented as a smartphone, laptop computer, or tablet computer, display 138 will typically be integrated with user system 130. By contrast, where user system 130 is implemented as a desktop computer, display 138 may take the form of a monitor separate from user system 130 in the form of a computer tower. Furthermore, display 138 of user system 130 may be implemented as a liquid crystal display (LCD), a light-emitting diode (LED) display, an organic light-emitting diode (OLED) display, a quantum dot (QD) display, or any other suitable display screen that performs a physical transformation of signals to light.

By way of overview, when a human observer views a perfect image, i.e., one entirely free of pixel anomalies, the attention of the observer is drawn to different portions of the image according to the creative intent of the creator of the image. However, the presence of a distracting pixel anomaly, which in principle can appear anywhere within an image, tends to undesirably shift the observer's attention to the pixel anomaly thereby diminishing, and in some instances ruining, the intended viewing experience. Nevertheless, as noted above, not all pixel anomalies are sufficiently distracting to require correction. For example, depending on its position within an image, its visual impact relative to other features in its local environment within the image, as well as the visual qualities of the image as a whole, some pixel anomalies may be highly distracting, while others may be less so, and still others may reasonably be disregarded without significantly effecting intended esthetic of the image. That is to say, not all pixel errors are of equal importance.

Accordingly, system 100, or user system 130, can be configured to predict the respective distraction levels of the pixel anomalies included in image 146 and to determine a confidence score for each prediction. The more distracting a pixel anomaly is predicted to be, i.e., the higher its predicted distraction level 152, the more important it is that the pixel anomaly be corrected.

System 100 or user system 130 may be trained and tested based on manually annotated data. In one specific use case of an annotation task carried out using thousands of images, such as five to six thousand images for example, the present automated approach to predicting the noticeability of pixel errors achieves substantial agreement with the results of evaluations carried out manually by human inspectors for pixel anomalies predicted to have the highest distraction level, yielding a Cohen's kappa coefficient of 0.7 and precision-recall area under the curve (AUC) of 0.87.

Figure 2:
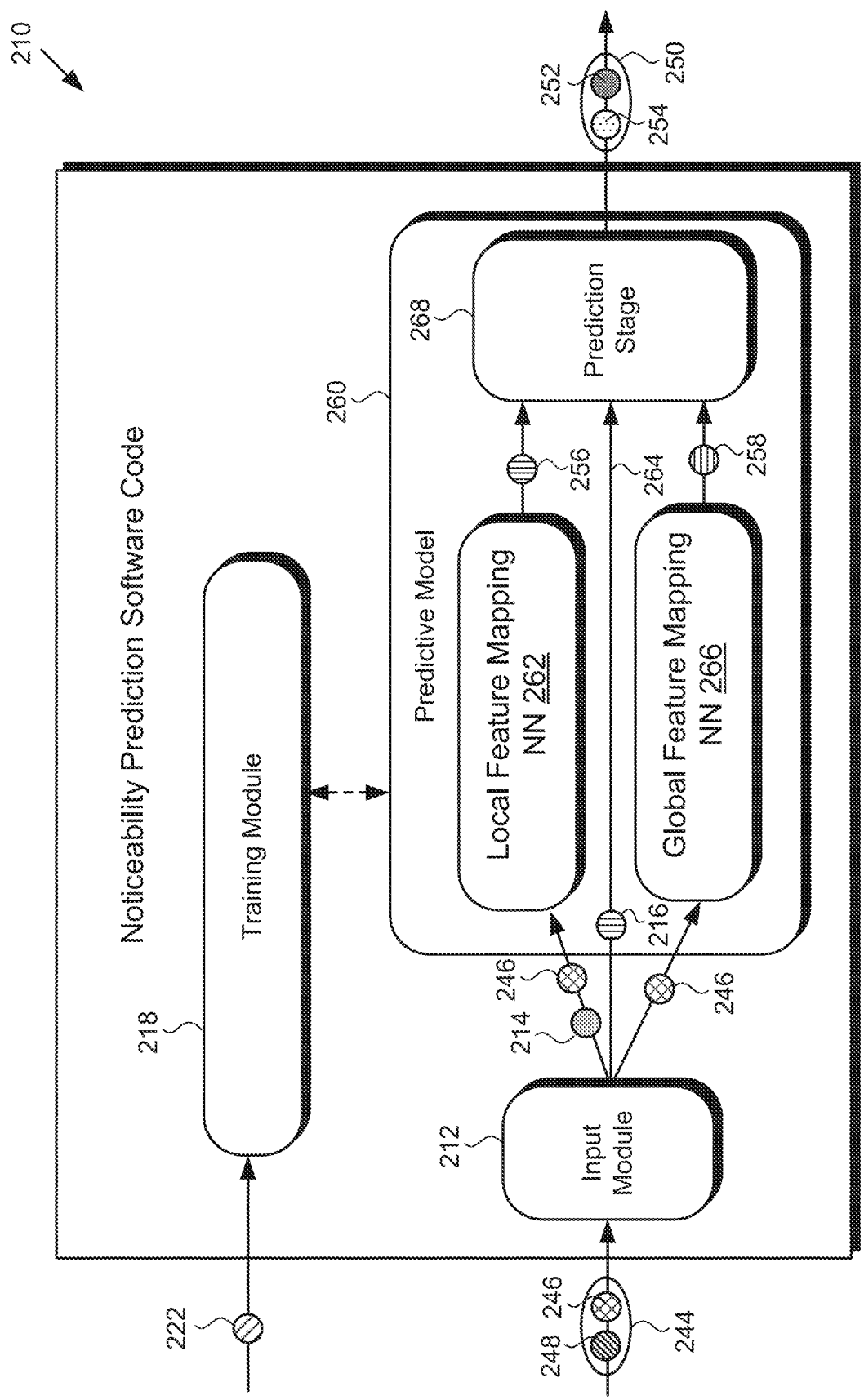
FIG. 2 shows a diagram of an exemplary noticeability prediction software code suitable for use by the systems shown in FIG. 1, according to one implementation.

Referring now to FIG. 2. FIG. 2 shows a diagram of an exemplary software code suitable for use by the systems shown in FIG. 1, according to one implementation. As shown in FIG. 2, noticeability prediction software code 210 includes input module 212, predictive model 260, and may include training module 218 for training local feature mapping NN 262 of predictive model 260. As further shown in FIG. 2, predictive model 260 may include multiple trained NNs, such as local feature mapping NN 262 providing a local branch of predictive model 260, and pre-trained global feature mapping NN 266 providing a global branch. In addition to those local and global branches provided by respective trained local feature mapping NN 262 and pre-trained global feature mapping NN 266, predictive model 260 may also include pixel parameter branch 264 and prediction stage 268. Prediction stage 268 may be configured to receive local feature map 256 from trained local feature mapping NN 262, pixel anomaly data 216 from pixel parameter branch 264, and global feature map 258 from pre-trained global feature mapping NN 266, and to output distraction data 250 including predicted distraction level 252 and corresponding confidence score 254. Also shown in FIG. 2 are training dataset 222 for training local feature mapping NN 262 of predictive model 260, input 244 including image data 248 and image 246 containing one or more pixel anomalies, and pixel anomaly location data 214 identifying the location or locations of each of one or more pixel anomalies contained in image 246.

Noticeability prediction software code 210, input 244 including image 246 and image data 248, training dataset 222, and distraction data 250 including predicted distraction level 252 and confidence score 254 correspond respectively in general to noticeability prediction software code 110, input 144 including image 146 and image data 148, training dataset 122, and distraction data 150 including predicted distraction level 152 and confidence score 154, in FIG. 1. That is to say, noticeability prediction software code 110, input 144, training dataset 122, and distraction data 150 may share any of the characteristics attributed to respective noticeability prediction software code 210, input 244, training dataset 222, and distraction data 250 by the present disclosure, and vice versa. Thus, although not explicitly shown in FIG. 1, noticeability prediction software code 110 may include features corresponding to each of input module 212, training module 218, and predictive model 260 including trained local feature mapping NN 262, pixel parameter branch 264, pre-trained global feature mapping NN 266, and prediction stage 268.

Image 146/246 including at least one pixel anomaly may be propagated through predictive model 260 composed of three parallel branches, which may be configured to run substantially concurrently. The local branch implemented by trained local feature mapping NN 262 provides local information with context dependencies by using a feature extractor and projecting a feature map region of image 146/246 that is local to the pixel anomaly over entire image 146/246. The global branch implemented by pre-trained global feature mapping NN 266 is responsible for providing global context with long-range dependencies. Pixel parameter branch 264 can be utilized to explicitly incorporate into the predictive model several pixel anomaly specific features, which may represent prior knowledge about the pixel anomaly itself from human QC inspectors. The three parallel branches process information progressively, for example from the broader global context view, to the narrower local context view, and then to the pixel anomaly itself. Features from the three branches are combined, such as by being concatenated for example, and are fed into a softmax classifier implemented by prediction stage 268 to predict the distraction level 252 and associated confidence score 254 for the pixel anomaly.

Local Branch:

A cropped patch of image 146/246 containing the pixel anomaly within image 146/246 can represent the local information. However, reliance on a small but isolated image patch sacrifices the advantage accruing from a larger receptive field that provides broader local neighborhood abstraction. Instead of direct operation on the local image patch, the local branch implemented by trained local feature mapping NN 262 uses the location of the pixel anomaly in image 146/246 that is identified by pixel anomaly location data 214 to crop a region-of-interest (ROI) on the feature map produced by the feature extractor of trained local feature mapping NN 262. It is noted that trained local feature mapping NN 262 can be instantiated using any convolutional model as its backbone, such as a residual neural network (ResNet), dense neural network (DenseNet), or EfficientNet, for example, as known in the art, which may be utilized to extract features. Alternatively, in some implementations, a feature-pyramid-network (FPN) architecture may be utilized to provide the feature extraction functionality of trained local feature mapping NN 262.

By way of example, a typical stride value s used in the present implementation is 32, which corresponds to 2L where L is the number of stages the backbone employs, e.g., both ResNet and DenseNet can perform five stages of down sampling with stride 2. Thus, a pixel anomaly with coordinates ($h_0$, $w_0$) can be projected on the feature map at coordinates ($h_0/32$, $w_0/32$). Considering the Convolutional Receptive Field and the Down sampling mechanism, this local prior feature, $w_f \in R^{1 \times 1 \times C_l}$, can represent the local context information around the pixel anomaly, where $C_l$ is the number of feature map channels.

Global Branch:

The local branch is limited in its ability to capture global context. A significant challenge to adding a global branch in parallel with the local branch is how to establish the spatial relationship between local and global features. The present implementation meets this challenge using invariant spatial semantic information on the entire image. To that end, pre-trained global feature mapping NN 266 may take the form of a pre-trained convolutional neural network (CNN) model trained on ImageNet. Pre-trained global feature mapping NN 266 is configured to serve as the global information encoder to retain the strong semantic information of image 146/246. Pre-trained global feature mapping NN 266 may be frozen to carry forward computing only, and can be instantiated using any of a variety of different backbones having large receptive fields, such as ResNet. DenseNet, EfficientNet, and various deep CNN architectures, for example.

Pixel Parameter Branch:

Pixel anomaly data 216 describing one or more parameters of the pixel anomaly included in image 146/246 can play an important role in the distraction level prediction process. It is noted that in some implementations, pixel anomaly data 216 may be pre-computed and may be received by system 100 as part of image data 148/248. However, in other implementations, pixel anomaly data 216 may be generated by noticeability prediction software code 110/210, executed by hardware processor 104 of computing platform 102, or by user system hardware processor 134 of user system 130, and using input module 212 to analyze the pixel anomaly included in image 146/246. That is to say, in some implementations the one or more pixel anomaly parameters described by pixel anomaly data 216 may be pre-computed, while in other implementations that/those parameters may be detected using noticeability prediction software code 110/210. The one or more pixel anomaly parameters described by pixel anomaly data 216 may include the color value, contrast, or distance from the image center of the pixel anomaly, to name merely a few examples.

Prediction Stage:

The information from the local branch implemented using trained local feature mapping NN 262, pixel parameter branch 264, and the global branch implemented using pre-trained global feature mapping NN 266 is combined at prediction stage 268. In one implementation, merely by way of example, the output of each of the three branches, i.e., local feature map 256 from trained local feature mapping NN 262, pixel anomaly data 216 from pixel parameter branch 264, and global feature map 258 from pre-trained global feature mapping NN 266 may be concatenated. As a specific but none limiting example, local feature mapping data, $w_f \in R^{1 \times 1 \times C_l}$, may have a spatial shape of 1×1, while pixel anomaly data 216 may simply stack its included scalar parameters to be $w_{pix} \in R^{1 \times 1 \times 6}$, where 6 represents six exemplary scalers, e.g., red, green, and blue values of the pixel anomaly, the normalized contrast value, and the normalized offset pair away from the center of image 146/246 of the pixel anomaly. In order to achieve the same spatial shape as the previous two feature vectors for the global feature mapping data. Global Average Pooling, as known in the art, may be employed to obtain $w_g \in R^{1 \times 1 \times C_g}$, where $C_g$ represents the number of channels of the last layer of pre-trained global feature mapping NN 266. It is emphasized that the aforementioned specific example is merely exemplary. For example, in other implementations fewer, or more, than the six scalars identified may be used, some of the specifically identified scalars may be omitted or may be substituted by others, and other spatial shapes and pooling techniques may be utilized.

Regarding the training of predictive model 260, local feature mapping NN 262 of predictive model 260 may be trained using training dataset 122/222 provided by training platform 120. In some implementations, training dataset 122/222 may be generated by training software code 128, executed by hardware processor 124 of training platform 120, as a just-noticeable difference (JND) based training dataset. The JND is a statistical rather than an exact quantity, which corresponds to the minimum change in a feature that is noticeable by trial subjects, and thus may vary from trial to trial depending on the feature being altered. For example, in the specific use case of pixel anomalies in an image, the JND may correspond to how large a pixel error must appear to be in order to be noticeable by a subject observer. The JND usually reported is the difference that an observer notices on a predetermined percentage of trials, such as fifty percent (50%), for example. It is noted that an exemplary method for generating a JND based training dataset for training predictive model 260 is described below by reference to FIG. 5.

Thus, as shown in FIG. 2, predictive model 260 may include one or more trained NNs, such as trained local feature mapping NN 262, pre-trained global feature mapping NN 266, or both trained local feature mapping NN 262 and pre-trained global feature mapping NN 266. In addition, when implemented to include multiple NNs, those NNs may be in parallel. e.g., trained local feature mapping NN 262 in parallel with pre-trained global feature mapping NN 266. Moreover, in some implementations, predictive model 260 may be trained using training dataset 122/222 in the form of a JND based training dataset.

The functionality of noticeability prediction software code 110/210 will be further described by reference to FIG. 3, in combination with FIGS. 1, 2, and 4. FIG. 3 shows flowchart 370 presenting an exemplary method for performing automated distraction level classification of pixel errors, according to one implementation. With respect to the method outlined in FIG. 3, it is noted that certain details and features have been left out of flowchart 370 in order not to obscure the discussion of the implementations described in the present application.

Figure 4A:
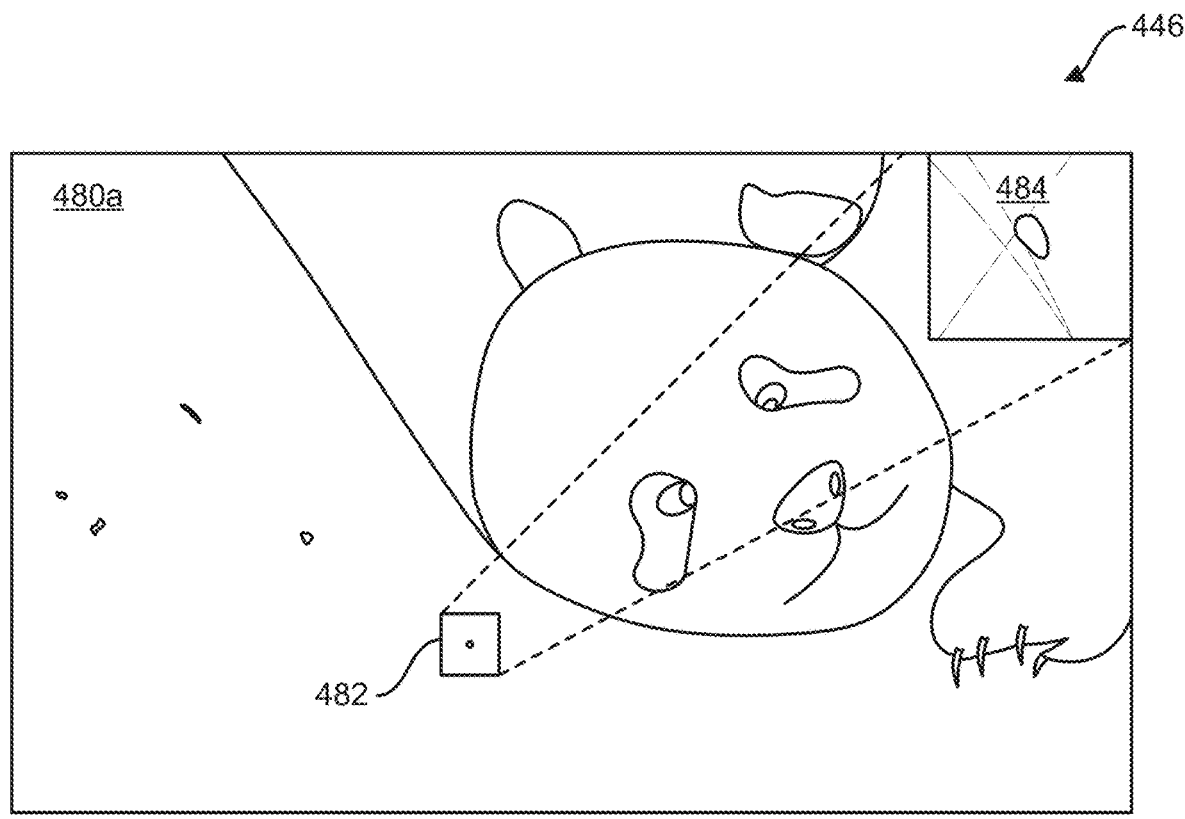
FIGS. 4A and 4B show exemplary images including a pixel anomaly that may not be sufficiently noticeable to be distracting, according to one implementation.
Figure 4B:
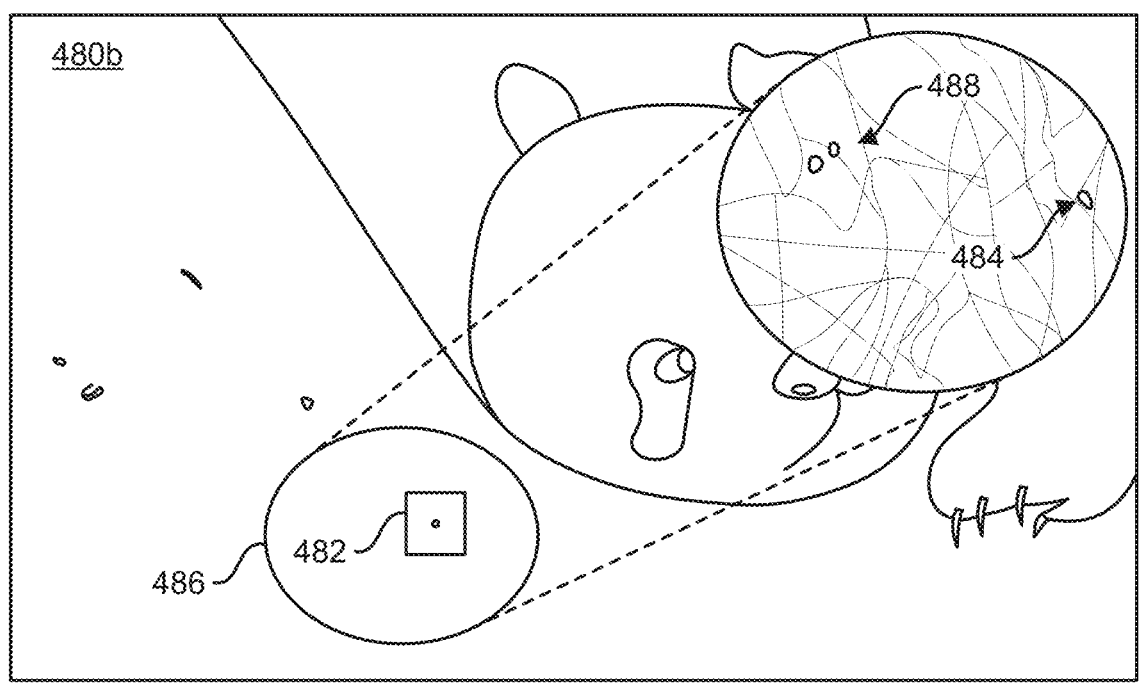

Referring to FIGS. 4A and 4B, these figures show representations 480*a* and 480*b* of image 446 including pixel anomaly 484. Also shown in FIGS. 4A and 4B are image region 482 local to and containing pixel anomaly 484, region 486 larger than and containing first image region 482, and distraction mitigating features 488 included in image 446. It is noted that image 446 corresponds in general to image 146/246 in FIGS. 1 and 2. Consequently, image 146/246 may share any of the features attributed to image 446 by the present disclosure, and vice versa. It is further noted that, as defined for the purposes of the present application, the term "local" as applied to a region of an image containing a pixel anomaly, refers to a region containing the pixel anomaly and a cluster of other pixels smaller than the image as a whole. As shown in FIGS. 4A and 4B, for example, image region 482 containing pixel anomaly 484 may be characterized as local to pixel anomaly 484, while region 486 larger than image region 482 may not be so characterized.

Referring now to FIGS. 1, 2, 3, and 4 in combination, flowchart 370 includes receiving input 144/244, input 144/244 including image 146/246/446 having pixel anomaly 484, input 144/244 further including image data 148/248 identifying the location of pixel anomaly 484 in image 146/246/446 (action 371). By way of example, in one implementation, user 132 may utilize user system 130 to interact with system 100 in order to predict distraction level 152/252 of pixel anomaly 484 included in image 146/246/446, which may be a digital photograph or a video frame, for instance.

It is noted that, regarding the concept of pixel anomaly detection, a review of image saliency detection and determination is described in the publication titled "Review of Visual Saliency Detection with Comprehensive Information," by Cong et al. (see Runmin Cong. Jianjun Lei, Huazhu Fu, Ming-Ming Cheng. Weisi Lin, and Qingming Huang. IEEE Transactions on Circuits and Systems for Video Technology, Vol. 29, issue 10, October 2019), which is hereby incorporated fully by reference into the present application.

As further shown by FIG. 1, user 132 may transmit image 146/246/446 from user system 130 to computing platform 102 of system 100 via communication network 140 and network communication links 142. Alternatively, image 146/246/446 may be stored in system memory 106. As yet another alternative, in some implementations user 132 may utilize user system 130 to predict distraction level 152/252 of pixel anomaly 484 included in image 146/246/446 locally, using the processor and memory resources of user system 130. In those implementations, image 146/246/446 may be obtained from user system memory 136 of user system 130. Action 371 may be performed using input module 212 of noticeability prediction software code 110/210, executed by hardware processor 104 of system 100, or by user system hardware processor 134 of user system 130.

Flowchart 370 further includes extracting, using predictive model 260, global feature map 258 of a global image region of image 146/246/446, where pixel anomaly 484 is within the global image region (action 372). Global feature map 258 of image 146/246/446 may be extracted using pre-trained global feature mapping NN 266, and may be output to prediction stage 268. Action 372 may be performed by noticeability prediction software code 110/210, executed by hardware processor 104 of system 100, or by user system hardware processor 134 of user system 130, and using pre-trained global feature mapping NN 266.

Flowchart 370 further includes extracting, using predictive model 260, local feature map 256 of a local image region of image 146/246/446, where pixel anomaly 484 is within the local image region, and the local image region is smaller than the global image region (action 373). Local feature map 256 of image 146/246/446 may be extracted using trained local feature mapping NN 262, and may be output to prediction stage 268. Action 373 may be performed by noticeability prediction software code 110/210, executed by hardware processor 104 of system 100, or by user system hardware processor 134 of user system 130, and using pre-trained global feature mapping NN 266.

It is noted that trained local feature mapping NN 262 is configured to extract local feature map 256 but not global feature map 258, while pre-trained global feature mapping NN 266 is configured to extract global feature map 258 but not local feature map 256. It is further noted that pre-trained global feature mapping NN 266 and trained local feature mapping NN 262 are configured to run independently of one another. It is also noted that, as shown by flowchart 370, actions 372 and 373 are typically performed in parallel, that is to say, substantially concurrently. However, in various implementations of the present method, action 372 may precede action 373 or action 373 may precede action 372.

In some implementations, flowchart 370 may further include optionally identifying one or more parameters of pixel anomaly 484 that are described by pixel anomaly data 216 provided to prediction stage 268 by pixel parameter branch 264 of predictive model 260 (action 374). As noted above, in some implementations, pixel anomaly data 216 may be pre-computed and may be received by system 100 as part of image data 148/248.

However, in other implementations, pixel anomaly data 216 may be generated by noticeability prediction software code 110/210, executed by hardware processor 104 of computing platform 102, or by user system hardware processor 134 of user system 130, and using input module 212 to analyze pixel anomaly 484 included in image 146/246/446. That is to say, in some implementations pixel anomaly data 216 may be pre-computed, while in other implementations the one or more parameters of pixel anomaly 484 that are included in pixel anomaly data 216 may be identified by being detected using noticeability prediction software code 110/210. As also noted above, the one or more pixel anomaly parameters described by pixel anomaly data 216 may include the color value, contrast, or distance from the image center of the pixel anomaly, to name merely a few examples.

It is noted that pixel parameter branch 264 is configured to run independently of pre-trained global feature mapping NN 266 and trained local feature mapping NN 262. It is further noted that, as shown by flowchart 370, in implementations in which optional action 374 is performed, actions 372, 373, and 374 are typically performed in parallel, that is to say, substantially concurrently. However, in various implementations of the present method, optional action 374 may precede either or both of actions 373 and 372.

Flowchart 370 further includes predicting, using predictive model 260 and based on global feature map 258, local feature map 256, and optionally the one or more parameters of pixel anomaly 484 described by pixel anomaly data 216, distraction level 152/252 of pixel anomaly 484 within image 146/246/446 (action 375). In one implementation, for example, the distraction level of pixel anomaly 484 may be predicted to belong to one of four classes including class 4 (highly distracting), class 3 (moderately distracting), class 2 (less distracting), and class 1 (not distracting). However, it is noted that other classification schemes including more, or fewer, classes may be used. Action 375 may be performed by noticeability prediction software code 110/210 using prediction stage 268 of predictive model 260, executed by hardware processor 104 of system 100, or by user system hardware processor 134 of user system 130.

In some implementations, flowchart 370 can conclude with action 375 described above. However, in other implementations, flowchart 370 further includes optionally determining, using predictive model 260, confidence score 154/254 for predicted distraction level 152/252 (action 376). Confidence score 154/254 may be normalized to range from no confidence (0.0) to complete confidence (1.0), for example, with confidence scores in the range from 0.85 to 1.0 corresponding to high confidence, and confidence scores below 0.5 corresponding to low confidence, again merely by way of example.

Referring to FIGS. 4A and 4B, based on examination of image region 482 local to pixel anomaly 484, pixel anomaly 484 appears to be an anomaly due to its contrast from other pixels within its local environment. Only when the larger receptive field included in global feature map 258 is examined, does it appear that pixel anomaly 484 has an appearance similar to mitigating features 488 in image 146/246/486.

Optional action 376 may be performed by noticeability prediction software code 110/210 using prediction stage 268 of predictive model 260, executed by hardware processor 104 of system 100, or by user system hardware processor 134 of user system 130, based on local feature map 256 and global feature map 258. It is noted that although the exemplary method outlined by flowchart 370 describes action 375 as preceding action 376, that sequence is provided merely as an example. In some implementations actions 375 and 376 may be performed substantially concurrently.

In some implementations, flowchart 370 can further include optionally outputting distraction data 150/250 corresponding to pixel anomaly 484, distraction data 150/250 including predicted distraction level 152/252 and optionally confidence score 154/254 if determined in optional action 376 (action 377). As shown by FIG. 1, in some implementations, distraction data 150/250 may be transmitted from computing platform 102 of system 100 to user system 130 via communication network 140 and network communication links 142 for display to user 132 by GUI 108 and display 138. Alternatively, distraction data 150/250 may be stored in system memory 106. As yet another alternative, in some implementations, user 132 may utilize user system 130 to generate distraction data 150/250 locally, using the processor and memory resources of user system 130. In those implementations, distraction data 150/250 may be output for display on display 138 or for storage in memory 136 of user system 130. Optional action 377 may be performed by noticeability prediction software code 110/210, executed by hardware processor 104 of system 100, or by user system hardware processor 134 of user system 130.

In some implementations, flowchart 370 may also further include optionally identifying pixel anomaly 484 for correction when predicted distraction level 152/252 satisfies a predetermined threshold (action 378). For example, even when confidence score 154/254 indicates low confidence in the accuracy of predicted distraction level 152/252, it may be advantageous or desirable to identify pixel anomalies having a high predicted distraction level, e.g., class 4 described above, for correction. Optional action 378 may be performed by noticeability prediction software code 110/210, executed by hardware processor 104 of system 100, or by user system hardware processor 134 of user system 130.

In some implementations, as shown in FIG. 3, the exemplary method outlined by flowchart 370 can also optionally include disregarding pixel anomaly 484 when distraction level 152/252 fails to satisfy a first predetermined threshold and confidence score 154/254 satisfies a second predetermined threshold (action 379). As discussed above, not all pixel anomalies in image 146/246/446 may justify the time and cost associated with their correction. Thus, in some implementations, those pixel anomalies predicted to have the lowest distraction level, e.g., class 1, in action 375, and determined to have a high associated confidence score, e.g., 0.85 or greater, in action 376, may be disregarded without substantially compromising the esthetics of image 146/246/446. Optional action 379 may be performed by noticeability prediction software code 110/210, executed by hardware processor 104 of system 100, or by user system hardware processor 134 of user system 130.

It is noted that in various implementations of the present method, optional actions 378 and 379 may be performed sequentially or concurrently. Moreover, in some implementations, one or both of optional actions 378 and 379 may preceded action 377, while in some implementations, optional action 378 may preceded action 376. In yet other implementations, one of optional actions 378 and 379 may be performed in lieu of the other, or one or both of optional actions 378 or 379 may be omitted.

With respect to the actions presented in flowchart 370, it is emphasized that, in various implementations, actions 371-373 and 375, or actions 371-373 in combination with any one or more of optional actions 374, 376, 377, 378, or 379 may be performed in an automated process from which human involvement may be omitted.

As noted above, in some implementations predictive model 260 may be trained using training dataset 122/222 in the form of a JND based training dataset (hereinafter "JND training dataset 122/222"). FIG. 5 shows flowchart 590 presenting an exemplary method for generating JND based training dataset 122/222 for use in training a predictive model to perform automated distraction level classification of pixel errors, according to one implementation. With respect to the method outlined in FIG. 5, it is noted that certain details and features have been left out of flowchart 590 in order not to obscure the discussion of the implementations described in the present application.

By way of overview, the generation of JND training dataset 122/222 includes creating a dataset of images each including a randomly generated pixel error having an initial size, such as a 1×1 pixel size for example, displaying those images to a human observer for a fixed period of time, such as two or three seconds for example, and asking the human observer to identify the pixel error present. If the human observer fails to notice the pixel error at the initial size, the pixel error is enlarged, for example by a single pixel, or from the initial 1×1 pixel size to 2×2 pixels, and the image is returned to the queue of images for subsequent redisplay to the human observer. This process is repeated until the pixel error is successfully identified, or until a predetermined number of iterations have been performed without identification of the pixel error, such as ten iterations, for example, or any other predetermined number of iterations deemed desirable. The process is repeated for multiple observers and the results are aggregated. Pixel errors that are consistently identified at the initial size are designated highly distracting, while pixel errors identified at progressively larger sizes are designated as being progressively less noticeable, with pixel errors that are never identified being designated not distracting.

Flowchart 590 begins with, for each of multiple images that includes a pixel error, displaying the image with the pixel error at a first pixel size to a human observer for a predetermined period of time (action 591). For example, as described above, the image including the pixel error at a first pixel size of 1×1 pixels may be displayed to the human observer for two or three seconds. Action 591 may be performed by training software code 128, executed by hardware processor 124 of training platform 120.

Flowchart 590 continues with determining whether the human observer notices the pixel error at the first pixel size (action 592). In some implementations, the human observer may be provided with an input device, such as a push-button, computer mouse, keyboard, trackpad, or touchscreen, for example, and may be instructed to actuate the input device if the pixel error is noticed as a result of action 591. A determination that the human observer has noticed the pixel error may be made if an actuation input is received from the human observer, while a determination that the human observer has noticed the pixel error may be made if an actuation input is not received from the human observer. Action 592 may be performed by training software code 128, executed by hardware processor 124 of training platform 120.

Flowchart 590 continues with assigning a first distraction level to the pixel error. e.g., class 4 (highly distracting), when the human observer notices the pixel error at the first pixel size (action 593). Action 593 may be performed by training software code 128, executed by hardware processor 124 of training platform 120 in response to receiving the actuation input described above.

In some implementations, flowchart 590 continues with displaying the image including the pixel error with the pixel error at a second pixel size, larger than the first pixel size, for the predetermined period of time when the human observer does not notice the pixel error at the first pixel size (action 595). For example, as described above, the pixel error at a first pixel size of 1×1 pixels may be enlarged by a single pixel or by more than one pixel, and the image including the enlarged pixel error may be displayed to the human observer for two or three seconds. Action 595 may be performed by training software code 128, executed by hardware processor 124 of training platform 120.

It is noted that when the same image having progressively increased pixel error sizes is repeatedly shown to the human observer, the pixel error enlargements may be perceived as motion within the image. Motion can increase saliency, and can cause part of the image to be more noticeable regardless of the intrinsic distraction level of the pixel error. In order to avoid the described undesirable motion effect, in some implementations, before displaying the image with the pixel error at the second pixel size to the human observer in action 595, the method outlined by flowchart 590 may include optionally displaying one or more others of the multiple images to the human observer for the predetermined period of time when the human observer does not notice the pixel error at the first pixel size (action 594). Optional action 594 may be performed by training software code 128, executed by hardware processor 124 of training platform 120.

Flowchart 590 continues with determining whether the human observer notices the pixel error at the second pixel size (action 596). As described above, the human observer may be provided with an input device and may be instructed to actuate the input device if the pixel anomaly is noticed as a result of action 595. Once again, a determination that the human observer has noticed the pixel error may be made if an actuation input is received from the human observer, while a determination that the human observer has noticed the pixel error may be made if an actuation input is not received from the human observer. Action 596 may be performed by training software code 128, executed by hardware processor 124 of training platform 120.

Flowchart 590 continues with assigning a second distraction level to the pixel error, lower than the first distraction level, e.g., class 3 (moderately distracting) lower than class 4 (highly distracting), when the human observer notices the pixel error at the second pixel size (action 597). Action 597 may be performed by training software code 128, executed by hardware processor 124 of training platform 120 in response to receiving the actuation input described above.

The method outlined by flowchart 590 can continue with optionally assigning progressively lower distraction levels to the pixel error when the human observer does not notice the pixel error at progressively larger sizes (action 598 and beyond). For example, flowchart 590 may continue with assigning a third distraction level to the pixel error, lower than the second distraction level, e.g., class 2 (less distracting) or class 1 (not distracting), when the human observer does not notice the pixel error at the second pixel size. Actions analogous to actions 594-597 or actions 595-597 may then be repeated for the pixel error at a third pixel size larger than the second pixel size, again for the pixel error at a fourth pixel size larger than the third pixel size, yet again for the pixel error at a fifth pixel size larger than the fourth pixel size, and so forth. Those actions may be repeated for a predetermined number of iterations, such as ten for example, or until the human observer notices the pixel error. Optional actions 598 and beyond may be performed by training software code 128, executed by hardware processor 124 of training platform 120 in response to receiving the actuation input described above.

Thus, the present application discloses systems and methods for performing automated distraction level classification of pixel errors that overcome the drawbacks and deficiencies in the conventional art. The implementation disclosed in the present application improves on the state-of-the-art by enabling the efficient prioritization of pixel anomalies based on their relationship to other features within an image. The present implementation further advantageously enables the identification of highly distracting pixel anomalies requiring corrections, as well as pixel anomalies that are predicted not to be distracting and, in some use cases, can be disregarded without substantially impacting the esthetics of an image including such pixel anomalies. Consequently, the present implementation advantageously renders the identification of pixel anomalies requiring correction both more efficient and less costly than conventional approaches.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a hardware processor; and
   a system memory storing a software code including a predictive model;
   the hardware processor configured to execute the software code to:
      receive an input, the input including an image having a pixel anomaly, and an image data identifying a location of the pixel anomaly in the image;

extract, using the predictive model, a global feature map of a global image region of the image, the pixel anomaly being located within the global image region;

extract, using the predictive model, a local feature map of a local image region of the image, the pixel anomaly being located within the local image region, the local image region being smaller than the global image region; and predict, using the predictive model and based on the global feature map and the local feature map, a distraction level of the pixel anomaly within the image.

2. The system of claim 1, wherein the hardware processor is further configured to execute the software code to:
identify the pixel anomaly for correction when the distraction level satisfies a predetermined threshold.

3. The system of claim 1, wherein the hardware processor is further configured to execute the software code to:
determine, using the predictive model, a confidence score for the distraction level; and
disregard the pixel anomaly when the distraction level fails to satisfy a first predetermined threshold and the confidence score satisfies a second predetermined threshold.

4. The system of claim 1, wherein the predictive model is trained using a just-noticeable difference (JND) based training dataset and comprises a plurality of trained neural networks (NNs) including a first trained NN in parallel with a second trained NN.

5. The system of claim 4, wherein the first trained NN is configured to extract the global feature map but not the local feature map, and wherein the second trained NN is configured to extract the local feature map but not the global feature map.

6. The system of claim 4, wherein the first trained NN and the second trained NN are configured to run independently of one another.

7. The system of claim 1, wherein the image data further identifies at least one pre-computed parameter of the pixel anomaly, and wherein the predictive model is further configured to predict the distraction level using the at least one pre-computed parameter.

8. The system of claim 7, wherein the at least one pre-computed parameter comprises at least one of a color value, a contrast, or a distance from an image center of the pixel anomaly.

9. The system of claim 1, wherein the hardware processor is further configured to execute the software code to:
detect at least one parameter of the pixel anomaly, and wherein the predictive model is further configured to predict the distraction level using the detected at least one parameter.

10. A method for use by a system having a hardware processor and a system memory storing a software code including a predictive model, the method comprising:
receiving an input, by the software code executed by the hardware processor, the input including an image having a pixel anomaly, and an image data identifying a location of the pixel anomaly in the image;
extracting, by the software code executed by the hardware processor and using the predictive model, a global feature map of a global image region of the image, the pixel anomaly being located within the global image region;
extracting, by the software code executed by the hardware processor and using the predictive model, a local feature map of a local image region of the image, the pixel anomaly being located within the local image region, the local image region being smaller than the global image region; and predicting, by the software code executed by the hardware processor and using the predictive model, based on the global feature map and the local feature map, a distraction level of the pixel anomaly within the image.

11. The method of claim 10, further comprising:
identifying the pixel anomaly for correction, by the software code executed by the hardware processor, when the distraction level satisfies a predetermined threshold.

12. The method of claim 10, further comprising:
determining, by the software code executed by the hardware processor and using the predictive model, a confidence score for the distraction level; and
disregarding the pixel anomaly, by the software code executed by the hardware processor, when the distraction level fails to satisfy a first predetermined threshold and the confidence score satisfies a second predetermined threshold.

13. The method of claim 10, wherein the predictive model is trained using a just-noticeable difference (JND) based training dataset and comprises a plurality of trained neural networks (NNs) including a first trained NN in parallel with a second trained NN.

14. The method of claim 13, wherein the first trained NN is configured to extract the global feature map but not the local feature map, and wherein the second trained NN is configured to extract the local feature map but not the global feature map.

15. The method of claim 13, wherein generating the JND based training dataset comprises:
for each one of a plurality of images that includes a pixel error:
displaying to a human observer for a period of time, the one of the plurality of images with the pixel error at a first pixel size;
determining, whether the human observer notices the pixel error at the first pixel size;
assigning a first distraction level to the pixel error, when determined that the human observer notices the pixel error at the first pixel size;
displaying to the human observer for the period of time, the one of the plurality of images with the pixel error at a second pixel size larger than the first pixel size, when determined that the human observer does not notice the pixel error at the first pixel size;
determining, when determined that the human observer does not notice the pixel error at the first pixel size, whether the human observer notices the pixel error at the second pixel size; and
assigning a second distraction level lower than the first distraction level, to the pixel error, when determined that the human observer notices the pixel error at the second pixel size.

16. The method of claim 10, wherein the image data further identifies at least one pre-computed parameter of the pixel anomaly, and wherein the predictive model is further configured to predict the distraction level using the at least one pre-computed parameter.

17. The method of claim 10, further comprising:
detecting, by the software code executed by the hardware processor, at least one parameter of the pixel anomaly, and wherein the predictive model is further configured to predict the distraction level using the detected at least one parameter.

18. A method for use by a training platform including a hardware processor, a memory storing a training software code, and a display to generate a just-noticeable difference (JND) based training dataset for use in training a predictive model, the method comprising:

for each one of a plurality of images that includes a pixel error:
- displaying to a human observer for a period of time, by the training software code executed by the hardware processor and using the display, the one of the plurality of images with the pixel error at a first pixel size;
- determining, by the training software code executed by the hardware processor, whether the human observer notices the pixel error at the first pixel size;
- assigning a first distraction level to the pixel error, by the training software code executed by the hardware processor, when determined that the human observer notices the pixel error at the first pixel size;
- displaying to the human observer for the period of time, by the training software code executed by the hardware processor and using the display, the one of the plurality of images with the pixel error at a second pixel size larger than the first pixel size, when determined that the human observer does not notice the pixel error at the first pixel size;
- determining, by the training software code executed by the hardware processor, when determined that the human observer does not notice the pixel error at the first pixel size, whether the human observer notices the pixel error at the second pixel size; and
- assigning a second distraction level lower than the first distraction level, to the pixel error, by the training software code executed by the hardware processor, when determined that the human observer notices the pixel error at the second pixel size.

19. The method of claim 18, further comprising:

for each one of the plurality of images that includes the pixel error:
- assigning a third distraction level, lower than the second distraction level, to the pixel error, by the training software code executed by the hardware processor, when determined that the human observer does not notice the pixel error at the second pixel size.

20. The method of claim 18, further comprising:

for each one of the plurality of images that includes the pixel error:
- before displaying to the human observer for the period of time, the one of the plurality of images with the pixel error at the second pixel size, displaying at least one other of the plurality images to the human observer for the predetermined period of time, by the training software code executed by the hardware processor, when determined that the human observer does not notice the pixel error at the first pixel size.

* * * * *